Dec. 6, 1955    F. E. BACHMAN ET AL    2,726,096
TRAILER AXLE ASSEMBLY
Filed March 12, 1953    2 Sheets-Sheet 1
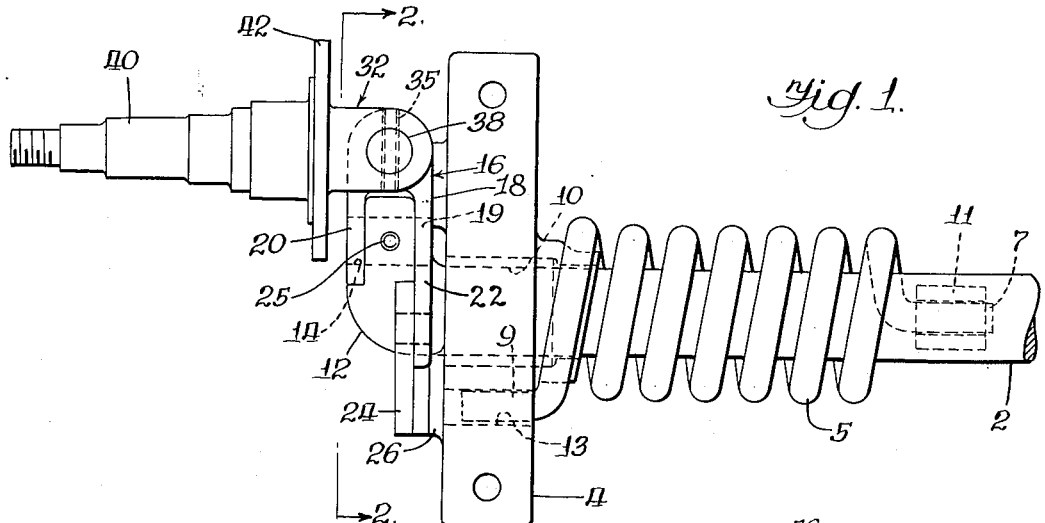
Inventors:
Fred E. Bachman
Albert F. Seelig, Jr.
Mehmet Kemal Coskun
By
Atty.

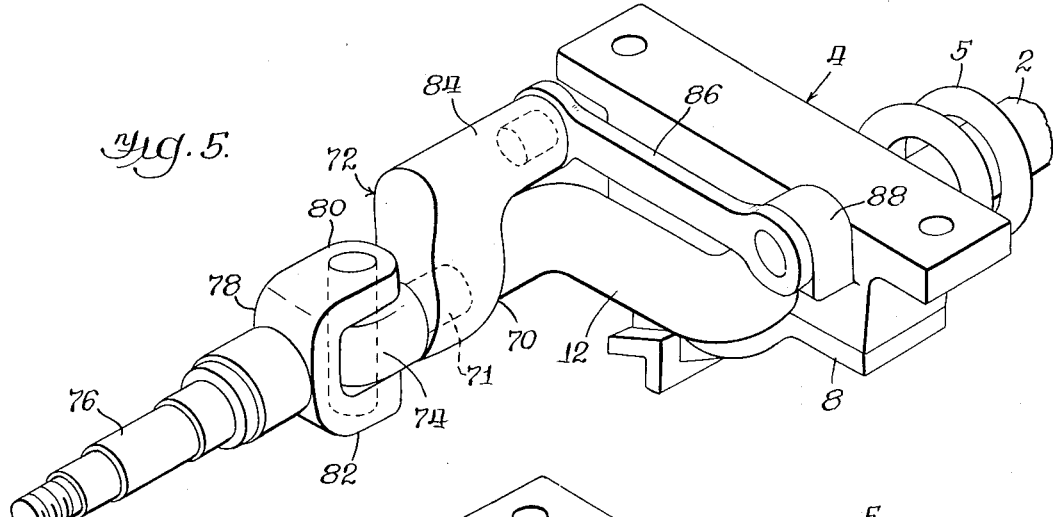
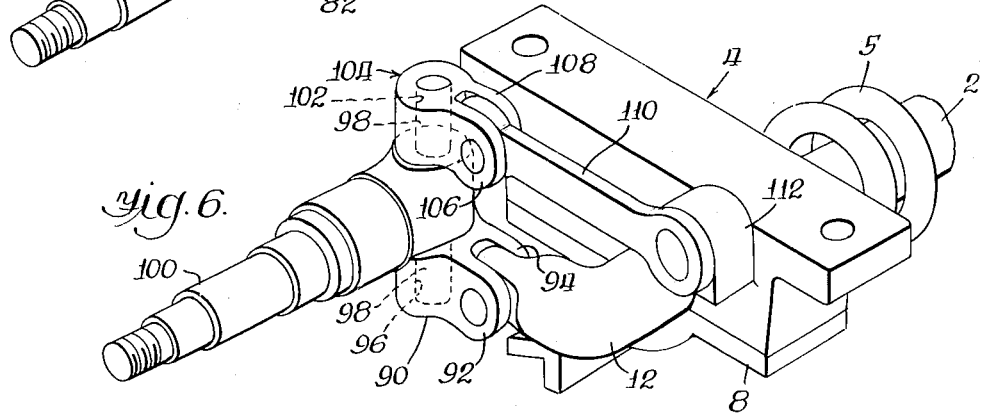
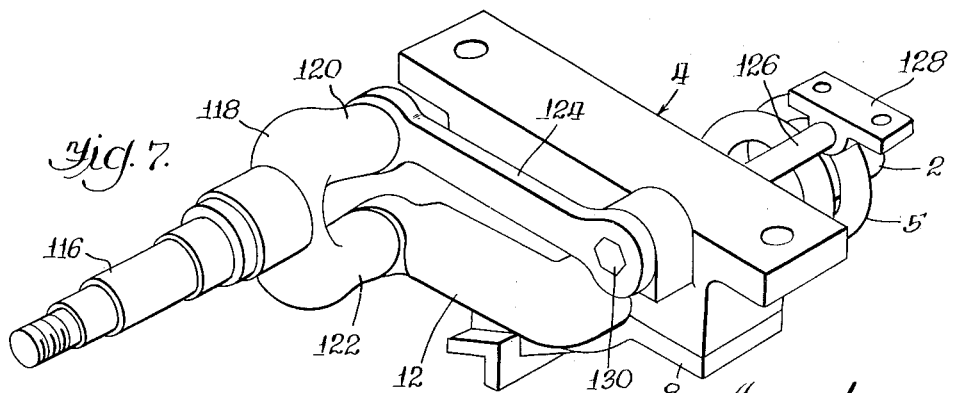

United States Patent Office 2,726,096
Patented Dec. 6, 1955

2,726,096
TRAILER AXLE ASSEMBLY

Fred E. Bachman, Albert F. Seelig, Jr., and Mehmet Kemal Coskun, Granite City, Ill., assignors to American Steel Foundries, Chicago, Ill., a corporation of New Jersey Application March 12, 1953, Serial No. 341,956

2 Claims. (Cl. 280—96.2)

The invention relates to axle assemblies used in supporting trailers or similar vehicles and more particularly to an adjustable spindle mounting therefor.

The invention comprehends an improvement in that type of axle frequently denominated "trail type" axle assembly, particularly disclosed and described in the patent to Frank F. Linn, No. 2,455,787, issued December 7, 1948.

More particularly, the improvement resides in the incorporation with said type axle of a steerable spindle, whereby the wheels supporting the associated vehicle may be turned to accommodate change of direction of motion of said vehicle.

It is a general object of the invention to provide a novel pivotal wheel mounting spindle for an axle of the type described.

It is the specific object of the invention to provide an axle having a wheel mounting spindle pivotal about a generally vertical axis in combination with a novel linkage whereby the axis of pivot of said spindle is maintained in a vertical position during resilient arcuate oscillation of said axle.

It is another specific object of the invention to provide an auxiliary torsion bar spring functionally incorporated with the above mentioned linkage and thereby aiding the resilient action of the axle assembly.

These and other objects of the invention will become apparent in the course of the following description and from an examination of the concerned drawings, wherein:

Figure 1 is a fragmentary plan view of one embodiment of our invention;

Figure 2 is a side elevational view taken along line 2—2 of Figure 1;

Figure 3 is a fragmentary top plan view of a different embodiment of our invention;

Figure 4 is a side elevational view taken along line 4—4 of Figure 3;

Figure 5 is a perspective view of another embodiment of our invention;

Figure 6 is a perspective view of a different embodiment of our invention, and

Figure 7 is another perspective view of a still different embodiment of our invention.

Describing the invention in detail and referring first to Figure 1, it will be seen that our novel axle assembly comprises a main shaft 2 journalled for rotation in a bracket 4. The bracket 4 in the embodiment of Figures 1 and 2 comprises a base 6 and cap 8 secured in any suitable manner to the base 6. The base and cap define an opening 10 transversely of the bracket and offering bushed journalled reception for an end portion of the main shaft 2. A coiled helical spring 5 is sleeved over the shaft 2 and is positioned thereon immediately adjacent the inboard sides of the bracket 4. Opposite ends of the spring 5 are formed with straight portions 7 and 9, the portion 7 being secured to the shaft 2 by means of a spring clip 11 which receives the end portion 7 of the spring 5 and is secured to the shaft 2 in any suitable manner, such as by welding. The other end 9 of the spring 5 is received within a hole 13 formed in the bracket 4 and extending transversely thereof. With the spring 5 assembled and connected to the shaft 2 and bracket 4 in the manner described, rotation of the shaft 2 within the opening 10 induces a bending moment into said spring whereby the spring is operative to resiliently resist rotative movement of said shaft. For a more detailed description of the resilient action of the shaft and spring assembly, attention is directed to the above mentioned patent to Frank F. Linn.

Externally of the bracket a crank 12 is formed, said crank extending transversely of the main shaft 2 and being formed with an opening 14 extending substantially parallel to the axis of the shaft 2 at the end of the crank. Pivoted to the end of the crank is a spindle mounting member 16, said member comprising spaced inboard and outboard arms 18 and 20, the pivotal connection being attained by means of the pin 19 received within the hole 14 at the end of said crank. The inboard arm 18 also presents an upwardly extending segment 22 extending above the crank 12 whereat it is connected at the end thereof with a lever 24 which in turn has its other end pivoted to a lug 26 of the bracket 4. A lockscrew 25 maintains the pin 19 in fixed position in the crank 12.

A generally vertical hole 30 is presented by the spindle mounting member 16 at a point rearwardly of its connection to the crank 12, said hole 30 affording means whereby a spindle bracket 32 comprising spaced arms 34 and 36 may be pivotally mounted on the spindle mounting member by means of pin 38. A lockscrew 39 maintains the pin 38 in fixed position in the member 16. A spindle 40 is rigidly connected to the spindle bracket 32 outboardly of a brake plate 42'. The spindle 40 is designed for conventional bearing mounting of an associated rotatable wheel (not shown).

In operation, as the associated vehicle is loaded, the main shaft 2 is urged to rotate whereby the crank 12 is carried arcuately about the longitudinal axis of said main shaft. As the crank 12 moves the segment 22 and the lever 24 cooperate to maintain the spindle mounting bracket 16 and hole 30 in a substantially vertical position throughout said arcuate motion. With the hole 30 maintained in said vertical position, the wheel mounting spindle 40 may be pivoted about the axis of its mounting pin thereby accommodating change in direction of motion of the associated vehicle.

Attention is now directed to Figures 3 and 4, wherein another embodiment of our invention is illustrated. Structurally, the axle assembly of Figures 3 and 4 is similar to that of the preceding embodiment, except that at the rearward extremity of the crank 12 another shaft 42 is formed, said other shaft extending outwardly from said crank and being arranged substantially parallel to the main shaft 2. Formed on the extremity of the shaft 42 is a journal 44 on which is pivotally mounted a spindle mounting member 46. Said spindle mounting member 46 comprises the vertically spaced lugs 48 and 50 disposed on opposite sides of the point of journalled connection between said member and said other shaft. Aligned holes 52, 52, having a vertically disposed axis are presented by the lugs 48 and 50. Adjacent the inboard end of the spindle mounting member 46 an upwardly extending arm 54 is formed. Said arm presents on its vertical extremity a pivot hole 56 whereby pivotal connection is made to one end of a lever 58, which in turn has its other end pivotally connected to the lug 60 of the bearing bracket 4. A spindle 62 presents a lug 64 at one end thereof for disposition intermediate the lugs 48 and 50 of the spindle mounting member 46. Pivotal connection is made between the spindle 62 and the member 46 by means of a pin connection between the holes 52 of said member and the lug 64 of the spindle.

The operation of the embodiment of Figures 3 and 4 is substantially similar to the operation of the above described embodiment. As the crank 12 is rotatively carried about the axis of the main shaft 2, the arm 54 and the pivotally connected lever 58 cooperate to maintain the spindle mounting bracket 46 and more particularly the axis of pivot of the connected spindle in a substantially vertical position during said arcuate motion.

Attention is now directed to Figure 5 illustrating another and different embodiment of the invention. The crank 12 again presents a shaft 70 extending outwardly therefrom at the trailing end of said crank. A spindle mounting member 72 is again journal-connected to the shaft or journal 70 at the bearing 71. The spindle mounting member 72 presents on its outboard side an arm 74 substantially aligned with the point of journalled connection between the mounting member and the crank 12. A conventional spindle 76 having a bracket 78 formed on its inboard end is pivotally connected to the arm 74 by means of pin connection between spaced arms 80 and 82 of the bracket 78 and the arm 74 of the spindle mounting member. The spindle mounting member 72 also presents an upwardly extending segment which connects to a horizontal portion or arm 84 disposed to overlie shaft 70 and the adjacent end of the crank 12. At the inboard extremity of the horizontal portion 84, pivotal connection is made between said portion and one end of a lever 86, which in turn has its opposite end pivoted to a lug 88 of the bearing bracket 4.

The operation of the embodiment of Figure 5 is substantially the same as that of the previously described embodiments. Again as the crank 12 is moved arcuately about the longitudinal axis of the main shaft 2, the lever 86 combines with the mounting member 72 to maintain said member, and more particularly the axis of pivot of the connection between said member and the spindle, in a substantially vertical position.

The embodiment of Figure 6 employs a crank 12 having an end portion formed substantially similar to the end portion of the crank utilized in the embodiment of Figures 1 and 2, that is, with a horizontally disposed pivot hole in the trailing end thereof. A lower spindle mounting member 90 comprising spaced arms 92 and 94 which embrace the mentioned trailing end of the crank 12 is pivotally connected thereto by means of pin connection between said hole and the arms of said member. Centrally of the lower mounting member 90 there is presented a journal opening 96, said opening receiving one of a pair of oppositely directed trunnions 98, 98 formed on the associated end of a spindle 100. The upper trunnion 98 is received within a journal opening 102 formed centrally within an upper spindle mounting member 104. Said upper spindle mounting member 104 also comprises a pair of spaced arms 106 and 108 which receive and embrace a related end of a lever 110. As in the other embodiments, the opposite end of the lever 110 is pivotally connected to a lug 112 formed integrally with the bearing bracket 4. Again the lever 110 functionally cooperates with the spindle mounting members 90 and 104 to maintain the axis of pivot of the associated spindle in a substantially vertical position during arcuate movements of the crank 12.

In the embodiment of Figure 7, a spindle 116 presents at its inboard end a spindle bracket 118. The spindle bracket 118 comprises vertically spaced horizontally directed legs 120 and 122. The leg 122 is connected, by a conventional swivel joint or universal connection, to the trailing extremity of the main shaft connected crank 12. The leg 120 of the bracket 118 is universally connected to the trailing end of a lever 124 disposed above and substantially parallel to the crank 12.

A torsion spring bar 126 disposed to extend substantially parallel to the main shaft 2 has one end thereof rigidly connected to a mounting clip 128, said clip being arranged for rigid connection to the underside of an associated vehicle body (not shown). The outwardly directed end of the torsion bar 126 is disposed outboardly of the bracket 4, said end being received and supported for relative rotative movement by a complementary hole extending transversely through the bracket 4. The outboard extremity 130 of the torsion bar 126 is fixedly secured to the related end of the lever 124, the connection between the lever 124 and the end 130 of the bar being preferably made by having a non-round formation of the end of the bar, such as the illustrated hex, complementally received within a hole of like configuration within the related end of the lever 124.

Again as the crank 12 is moved arcuately about the longitudinal axis of the main shaft, the lever 124 maintains the spindle bracket 118 in a susbtantially vertical position, thereby accommodating horizontal pivoting of the spindle at any position of the related crank. It will be noted, however, that as the crank moves arcuately and resiliently against the action of the associated coiled spring the pivot of the lever 124 is accommodated by resilient twisting action of the torsion spring bar 126. The resilient twisting of said bar 126 resists the pivotal action of the crank 12 and thus aids the main axle spring to flexibly support the associated vehicle.

Thus it will be seen that in each of the above described embodiments we have provided a wheel mounting spindle and a novel connection to an axle of the trail type whereby said spindle may be pivoted on a substantially vertical axis to directionally turn the associated wheel during all movements and in all positions of the associated axle assembly.

We claim:

1. In an axle assembly, a bearing bracket, a main shaft journalled for rotation therein, a crank integrally formed with the shaft outboardly of the bracket and extending transversely of the shaft, a lever having one end thereof pivoted to the bracket above the journal connection between the shaft and the bracket end to one side thereof as seen in end elevational view, said lever directionally paralleling the crank, a journal integrally formed on the end of the crank remote from the shaft end having an axis parallel to the axis of the shaft, a spindle mounting member on said journal end pivotally movable therearound, said member comprising an arm extending above said journal and overlying said crank, a pivotal connection between the upper end of the arm and the end opposite the mentioned end of said lever, a spindle, means connecting the spindle to the member for pivotal movement about a substantially vertical axis, said lever, member, and crank arm forming a parallelogram linkage, whereby said last mentioned vertical axis is maintained in a fixed relation to the vertical during all movements of the shaft.

2. An axle assembly according to claim 1, wherein said means comprises vertically spaced lugs on the outboard side of the member, another lug on the spindle disposed intermediate said spaced lugs, said lugs having aligned holes therein, and a vertically arranged pin disposed in said holes to pivotally connect said lugs.

References Cited in the file of this patent

UNITED STATES PATENTS

| | | |
|---|---|---|
| 2,023,254 | Stimson | Dec. 3, 1935 |
| 2,099,312 | Porsche | Nov. 16, 1937 |
| 2,117,590 | Armstrong | May 17, 1938 |
| 2,351,291 | Ross | June 13, 1944 |
| 2,409,501 | Krotz | Oct. 15, 1946 |
| 2,426,513 | Linn | Aug. 26, 1947 |

FOREIGN PATENTS

| | | |
|---|---|---|
| 359,023 | Great Britain | Oct. 19, 1931 |